(12) United States Patent
Raj et al.

(10) Patent No.: US 9,152,650 B1
(45) Date of Patent: Oct. 6, 2015

(54) MOBILE DEVICE DATA RECOVERY

(75) Inventors: Anand Raj, Bangalore (IN);
Rangarajan Suryanarayanan, Santa Clara, CA (US); Christopher Hercules Claudatos, San Jose, CA (US); Satish Basavaraj, Bangalore (IN); Joseph Elwin Fernandes, Karnataka (IN); Sudhindra M. Sheshadrivasan, Bangalore (IN); Deepak Visweswaraiah, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/752,059

(22) Filed: Mar. 31, 2010

(51) Int. Cl.
*G06F 17/30* (2006.01)

(52) U.S. Cl.
CPC .................................. *G06F 17/3023* (2013.01)

(58) Field of Classification Search
None
See application file for complete search history.

(56) References Cited

U.S. PATENT DOCUMENTS

| | | | |
|---|---|---|---|
| 5,760,917 A | 6/1998 | Sheridan | |
| 7,177,865 B2 | 2/2007 | Sasaki et al. | |
| 7,584,225 B2 | 9/2009 | Jiang et al. | |
| 7,643,824 B2 | 1/2010 | Onyon et al. | |
| 7,676,573 B2 | 3/2010 | Herzog et al. | |
| 2001/0028363 A1* | 10/2001 | Nomoto et al. | 345/748 |
| 2002/0004402 A1 | 1/2002 | Susuki | |
| 2002/0103908 A1 | 8/2002 | Rouse et al. | |
| 2002/0188704 A1* | 12/2002 | Gold et al. | 709/221 |
| 2003/0037100 A1 | 2/2003 | Olejar et al. | |
| 2004/0111415 A1 | 6/2004 | Scardino et al. | |
| 2004/0172279 A1* | 9/2004 | Carolan et al. | 705/1 |
| 2004/0242197 A1 | 12/2004 | Fontaine | |
| 2005/0044235 A1 | 2/2005 | Balahura et al. | |
| 2005/0131923 A1 | 6/2005 | Noguchi et al. | |
| 2005/0191998 A1 | 9/2005 | Onyon et al. | |
| 2005/0237567 A1 | 10/2005 | Morris | |
| 2006/0224742 A1 | 10/2006 | Shahbazi | |
| 2006/0242279 A1 | 10/2006 | Chen et al. | |
| 2007/0113275 A1 | 5/2007 | Khanna et al. | |
| 2007/0129058 A1 | 6/2007 | Landschaft et al. | |
| 2007/0207729 A1* | 9/2007 | Chen et al. | 455/15 |
| 2008/0043774 A1 | 2/2008 | Achtermann et al. | |
| 2008/0059495 A1 | 3/2008 | Kiessig et al. | |
| 2008/0160964 A1 | 7/2008 | Lichtenfeld et al. | |
| 2008/0177825 A1 | 7/2008 | Dubinko et al. | |
| 2008/0201668 A1 | 8/2008 | Roy | |
| 2008/0208617 A1 | 8/2008 | Onyon et al. | |
| 2009/0028049 A1 | 1/2009 | Boudreau et al. | |
| 2009/0036111 A1 | 2/2009 | Danford et al. | |
| 2009/0041230 A1* | 2/2009 | Williams | 380/28 |
| 2009/0074380 A1* | 3/2009 | Boston et al. | 386/83 |
| 2009/0100423 A1 | 4/2009 | Doyle et al. | |
| 2009/0130971 A1 | 5/2009 | Piekarski | |
| 2009/0144657 A1 | 6/2009 | Zhang et al. | |
| 2009/0172694 A1 | 7/2009 | Nochimowski et al. | |
| 2009/0198772 A1 | 8/2009 | Kim et al. | |
| 2009/0282125 A1 | 11/2009 | Jeide et al. | |

(Continued)

*Primary Examiner* — Bai D. Vu
(74) *Attorney, Agent, or Firm* — Staniford Tomita LLP

(57) ABSTRACT

A method, article of manufacture, and apparatus for recovering mobile device data is disclosed. In some embodiments, this includes using a processor to access a server with a unique identifier, determining data to be recovered from the server to a target mobile device, transmitting the determined data to the target mobile device, and storing the transmitted data on the target mobile device. The determined data may come from a source mobile device, and the determined data may be recovered to a target mobile device or multiple target mobile devices.

20 Claims, 9 Drawing Sheets

(56) References Cited

U.S. PATENT DOCUMENTS

| | | |
|---|---|---|
| 2009/0300119 A1 | 12/2009 | Nguyen |
| 2009/0307284 A1* | 12/2009 | Welingkar et al. ............ 707/204 |
| 2009/0307333 A1 | 12/2009 | Welingkar et al. |
| 2009/0319349 A1 | 12/2009 | Wu |
| 2010/0100465 A1 | 4/2010 | Cooke et al. |
| 2010/0124196 A1 | 5/2010 | Bonar et al. |
| 2010/0131764 A1 | 5/2010 | Goh |
| 2010/0151822 A1 | 6/2010 | Medvinsky et al. |
| 2010/0153335 A1 | 6/2010 | Balducci et al. |
| 2010/0169154 A1 | 7/2010 | Kraft et al. |
| 2010/0190478 A1 | 7/2010 | Brewer et al. |
| 2010/0235504 A1 | 9/2010 | Sengupta et al. |
| 2010/0287307 A1 | 11/2010 | John |
| 2011/0016089 A1 | 1/2011 | Freedman et al. |
| 2011/0047341 A1 | 2/2011 | Yu et al. |
| 2011/0113346 A1 | 5/2011 | O'Shaugnessy et al. |
| 2011/0176482 A1 | 7/2011 | Vizor et al. |
| 2011/0185186 A1 | 7/2011 | Adams et al. |
| 2011/0185202 A1 | 7/2011 | Black et al. |
| 2011/0209221 A1 | 8/2011 | Hanson et al. |
| 2011/0306326 A1 | 12/2011 | Reed et al. |
| 2012/0064908 A1 | 3/2012 | Fox et al. |
| 2012/0142310 A1* | 6/2012 | Pugh et al. .................... 455/406 |
| 2013/0335352 A1 | 12/2013 | Sako et al. |

\* cited by examiner

MOBILE DEVICE DATA RECOVERY

CROSS REFERENCE TO RELATED APPLICATIONS

This application is related to co-pending U.S. patent application Ser. No. 12/752,052 for MOBILE DEVICE DATA PROTECTION and filed concurrently herewith, which is incorporated herein by reference for all purposes; and to co-pending U.S. patent application Ser. No. 12/752,064 for MOBILE DEVICE GROUP-BASED DATA SHARING and filed concurrently herewith, which is incorporated herein by reference for all purposes; and to co-pending U.S. patent application Ser. No. 12/752,066 for MOBILE DEVICE NETWORK DATA SYNCHRONIZATION and filed concurrently herewith, which is incorporated herein by reference for all purposes; and to co-pending U.S. patent application Ser. No. 12/752,068 for CACHE-BASED MOBILE DEVICE NETWORK RESOURCE OPTIMIZATION and filed concurrently herewith, which is incorporated herein by reference for all purposes; and to co-pending U.S. patent application Ser. No. 12/752,069 for MOBILE DEVICE SNAPSHOT BACKUP and filed concurrently herewith, which is incorporated herein by reference for all purposes; and to co-pending U.S. patent application Ser. No. 12/752,072 for AUTOMATIC BACKUP UPDATE BASED ON SERVICE PROVIDER POLLING and filed concurrently herewith, which is incorporated herein by reference for all purposes.

FIELD OF THE INVENTION

The present invention relates generally to data systems, and more particularly, to systems and methods of efficiently protecting information on mobile devices.

BACKGROUND OF THE INVENTION

Mobile devices are playing an increasingly important role in modern life. Businesses use mobile devices for instantaneous communication to employees and customers across diverse geographical locations. Friends and families use mobile devices to keep in touch, share photos, and record memories.

The increase in mobile device utilization comes with a corresponding increase in data stored on mobiles devices. More photos are being stored, more videos are being recorded, and more messages are being sent by mobile devices. With more and more data being stored on mobile devices, it is critical to provide data protection for mobile devices.

There have been attempts to backup data stored on mobile devices. Such attempts include connecting the mobile device to a desktop computer via a cable and transferring data through the cable connection.

Unfortunately, there may be times when a backup needs to be performed, but no wired or cable connection is available.

There is a need, therefore, for an improved method, article of manufacture, and apparatus for protecting information stored on mobile devices.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
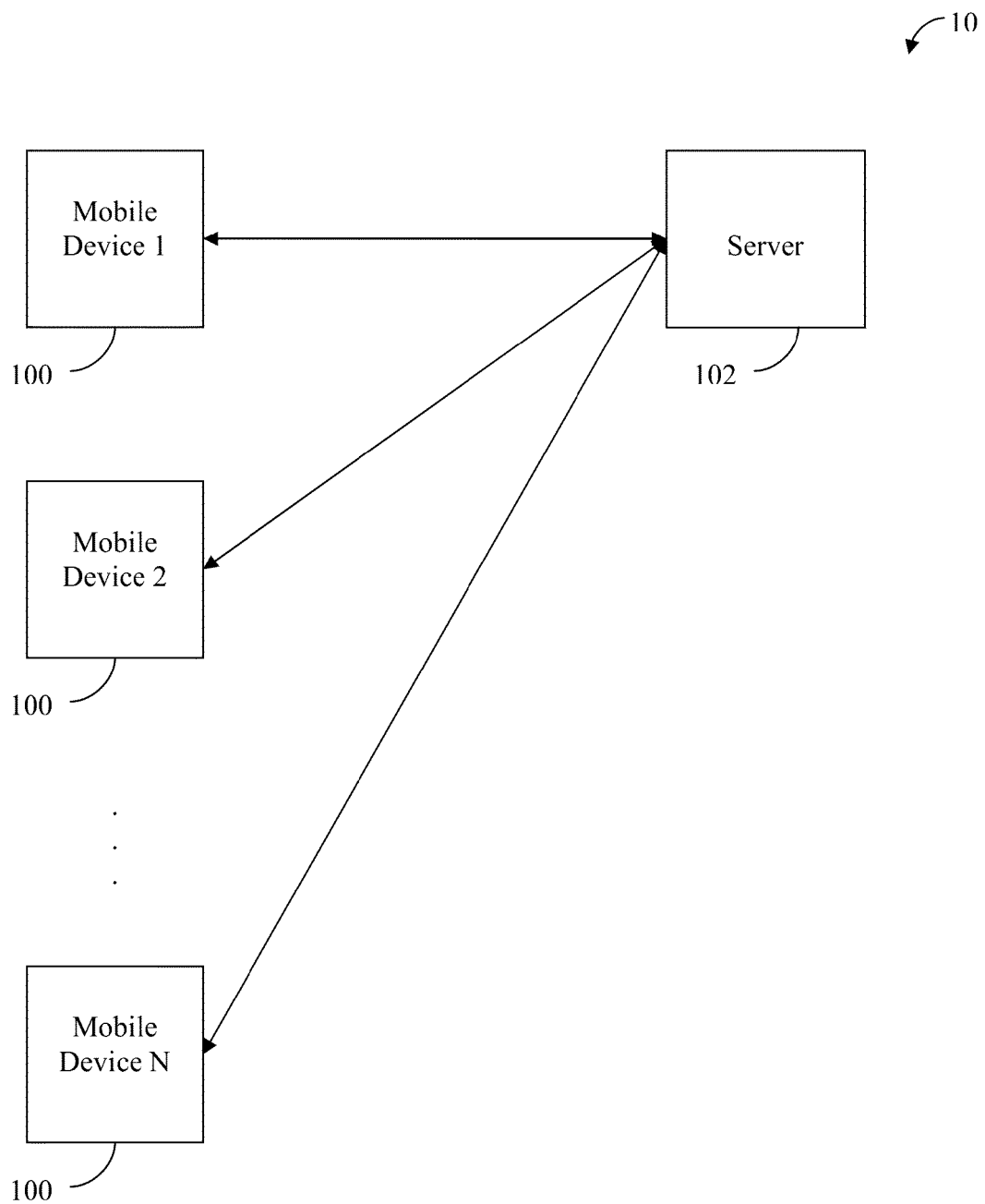
FIG. 1 is a diagram of a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates a data system in accordance with one embodiment of the present invention. Data System 10 has Mobile Devices 1, 2, . . . , N 100, and Server 102. Data from Mobile Device 100 may be stored on Server 102, and data stored on Server 102 may be retrieved by Mobile Device 100.

Mobile devices may include a variety of devices, such as cell phones, smart phones (e.g. Blackberry, iPhone, etc.), laptops, netbooks, tablet PCs, iPADs, and personal digital assistants (PDAs), among others.

Mobile Devices 100 may be access Server 102 through a variety of means. Such connections are well known in the art, and may include 3G, General Packet Radio Service (GPRS), and WiFi, among others. It is anticipated that Mobile Devices 100 may utilize newer access technologies as they are developed to access Server 102.

Though FIG. 1 illustrates a single Server 102, multiple servers may be utilized. Further, Data System 10 may be a cloud computing system, and Server 102 may be part of a cloud computer system. Cloud computing is well understood in the art, and generally includes provisioning dynamically scalable and often virtualized resources as a service over the internet. Thus, in a cloud computing system, Server 102 may be a virtual server and actually reside over multiple physical servers. Similarly, in a cloud computing system, there may be multiple Server 102s, and the multiple Server 102s may be virtual servers residing in a single physical server, or in multiple physical servers.

Transferring data from Mobile Device 100 to Server 102 may be accomplished by a variety of applications and services. In some embodiments, Atmos Online, a cloud storage service provided by EMC Corporation, may be utilized. An Atmos Online client (may also be referred to as "Atmos client") may be installed on a mobile device, allowing the mobile device to access an Atmos Online server (may also be referred to as "Atmos server").

Figure 2A:
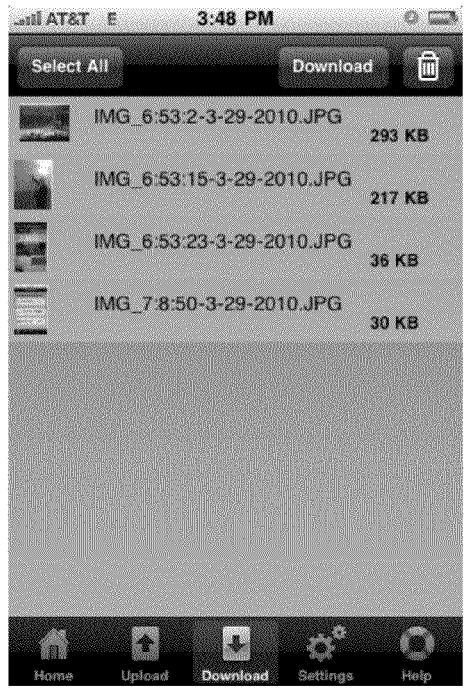
FIGS. 2A-2D illustrate sample screen shots in accordance with some embodiments.

FIGS. 2A-2D illustrates a mobile device client in accordance with some embodiments. FIG. 2A illustrates a lists of photo files stored on an Atmos server, and which may be downloaded onto the mobile device having the Atmos client. Though FIG. 2A lists photo files and their corresponding thumbnails, the client is equally capable of listing other file types, with or without a thumbnail. For example, the client may list video files, with a screenshot of the video as a thumbnail. The client may also list text files with no corresponding thumbnail. Further examples of information stored on an Atmos server may include contact information, such as email addresses, phone numbers, etc. Further, the mobile device client may decide which photos to restore (e.g. select the first two photos on a list, leave the rest alone, and downloaded selected photos), or which photos to erase. Similarly, the mobile device client may decide which photos to upload or backup to the server (e.g. select certain photos, leave the rest alone, and backup the selected photos).

Figure 2B:

FIG. 2B illustrates a screen showing the time of the most recent upload, the status of the Atmos server, and the amount of storage used on the Atmos server in accordance with some embodiments. In some embodiments, the most recent upload may also specify the name of the file or object most recently updated. In some embodiments, the storage used screen may also specify how much storage is available on the Atmos server. In addition, metadata (data about data) may be displayed. For example, the size of each individual object may be displayed (e.g. size in KB), date of object creation, date of last modification, or the owner, among others.

Figure 2C:
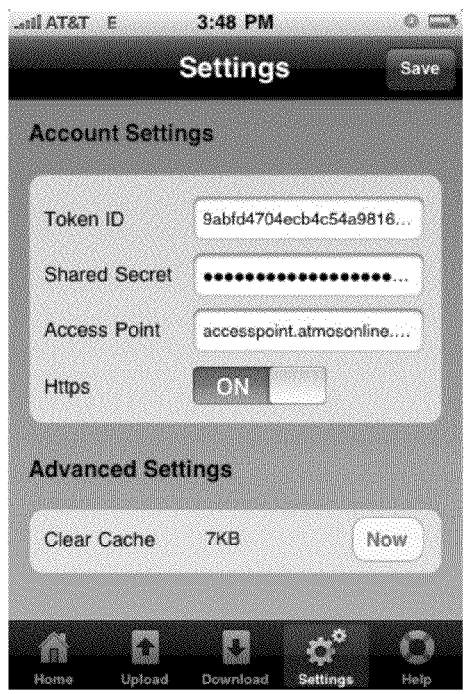

FIG. 2C illustrates a login screen for the Atmos client in accordance with some embodiments. The login screen includes the "username" field, the "auth key" field, and the "auth url" field, among others. The username field is used to input the username. The username may also be called userid, login name, etc.

Figure 2D:

FIG. 2D illustrates a download screen for the Atmos client in accordance with some embodiments. The download screen shows pictures and contacts being available for download. Contacts may include the contact information (e.g. phone number, email address, name, location, etc.) of people of interest, such as friends, family members, and business partners, among others. Pictures may be in a variety of formats, such as .jpg, .bmp, and .gif, among others. Clicking on "Pictures" in FIG. 2D may bring the user to FIG. 2A in some embodiments. Although FIG. 2D only shows Contacts and Pictures being available for download, some embodiments may include other options for download. These may include the option to download videos, text files, configuration settings (e.g. phone display settings, favorites, etc.), and music files, among others, from the Atmos server. There are many types of data which may be stored on, and downloaded from, an Atmos server.

The ability to backup data from mobile devices to servers (or the cloud) via a wireless connection (e.g. 3G, Wifi, etc.) provides many benefits. One of the benefits is that data on the mobile device can be backed up anywhere and anytime a wireless connection is available. For example, a user may take a picture on a smartphone, and immediately upload the picture to an Atmos server. In other words, the user backs up the picture on an Atmos server, and immediately provides protection for the picture. This is a much more convenient method than taking the picture on the smartphone, returning home, connecting the smartphone to a desktop via a cable, and transferring the picture via the cable. Further, in the case of using a wired connection to backup data, the data is at risk of loss or damage before the data is transferred to a desktop. For example, a user may take a picture in a location far from his desktop. During the trip home, the user may drop the mobile device, inclement weather may damage the phone, or other intervening events may cause data loss or damage.

Data may be stored on an Atmos server in a variety of methods. For example, one method includes using email to send a photo to an Atmos server. Mobile devices, as well as desktop PCs, are capable of attaching photos and other files in email messages. In some embodiments, the email message may contain specific information, which identifies it as being an email intended for receipt by an Atmos server. This specific information may include Atmos account information. For example, the subject may be "ATMOS USERNAME1," and the first line in the body may be "PassWord1," indicating that the photo attached in the email is intended to be stored in USERNAME1's Atmos account.

Figure 3:
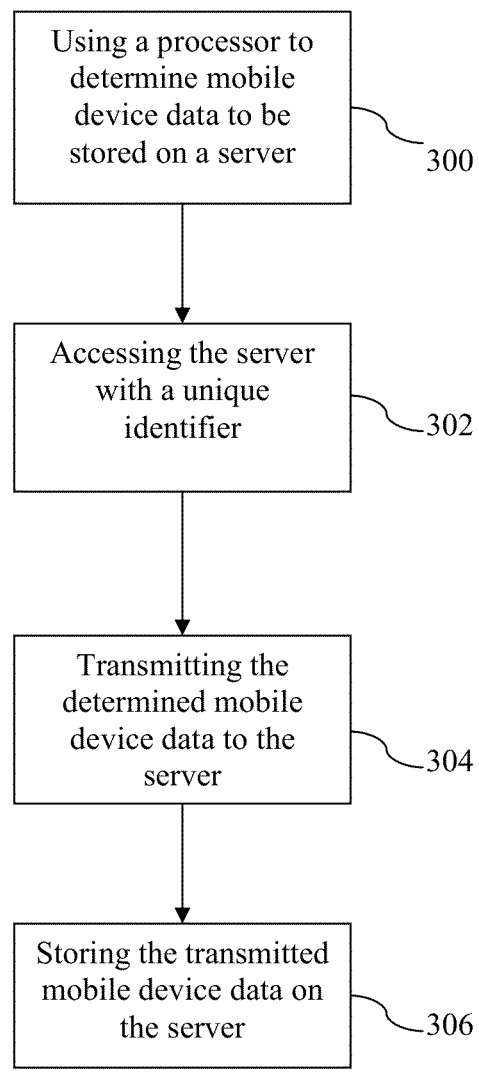
FIG. 3 is a flowchart illustrating a method to backup mobile device data in accordance with some embodiments.

FIG. 3 illustrates a method to backup mobile device data in accordance with some embodiments. The method is, step 300 using a processor to determine mobile device data to be stored on a server, step 302 accessing the server with a unique identifier, step 304 transmitting the determined mobile device data to the server, and step 306, storing the transmitted mobile device data on the server.

In some embodiments, a receipt email address may be created for each Atmos account. A user may then email photos to the receipt email address (e.g. USERNAME1@atmos.server.com), and provide a password in the subject or body of the email.

Similarly, the ability to restore data from servers (or the cloud) to mobile devices via wireless connection provides many benefits. One such benefit is that data, or a select portion of that data, on the server can be restored to the mobile device anywhere and anytime a wireless connection is available. To illustrate, suppose a user has badly damaged a mobile device. The user takes the mobile device to a repair shop, but the repair shop is only able to bring the mobile device back to factory default settings. All the user's data (e.g. configuration settings, contacts, emails, messages, photos, videos, etc.) are all gone. In some embodiments, the user may begin immediately restoring the user's data by installing an Atmos client on the mobile device. The Atmos client may be downloaded onto the mobile device through a variety of means, such as through the iTunes app store provided by Apple Computers, Inc., or through the web browser of smartphones, among others. Once the Atmos client is installed, the user may user the Atmos client to access the user data stored on an Atmos server, and begin restoring the user data to the mobile device. The user may begin and finish this process all at the repair shop, assuming the repair shop has a wireless connection (e.g. 3G, Wifi, etc.). It is anticipated that the user may provide the repair shop with relevant Atmos information (e.g. username, authentication, etc.), such that the repair shop is able to restore the user's data on behalf of the user.

Another benefit of restoring data from servers (or the cloud) is the ability to transfer files, contacts, or other types of data to a temporary mobile device. A temporary mobile device is a mobile device that is meant to be used only for a limited time, or for limited purposes. For example, if a user sends in an original mobile device for repair, the user may be issued a temporary mobile device while the original device is being repaired. Upon the completion of repairs on the original mobile device, the user must return the temporary mobile device. Further, mobile devices are typically designed for use within certain geographical locations. For example, a mobile device designed for use in North America may not be usable in Europe. Similarly, service providers (e.g. AT&T, Verizon, Sprint, etc.) have varying coverage depending on geographical location. A mobile device with AT&T as a service provider may not receive a signal, or service, in an area where Verizon provides coverage, or service. Thus, it may be desirable for a user to have a temporary mobile device when travelling through many different geographical locations. To illustrate, suppose a user works in the United States, and has a mobile device that is only usable in North America. If the user travels to Europe to meet business partners or customers, the user would not be able to use North American mobile device, or access the contacts and data stored on the North American mobile device, during the business trip. The user may want to use a temporary mobile device (e.g. European mobile device) while in Europe to communicate with the business partners or customers, and would want the temporary mobile device to have the contact information of the business partner or customers. In some embodiments, the user would be able to upload contacts from the North American mobile device to an Atmos server, restore the contacts (or a selected portion of the contacts) from the Atmos server to the temporary mobile device, and conduct business as usual seamlessly. Further, the user may want to utilize or show certain documents from the North American mobile device, and such documents may be restored onto the temporary mobile device.

Figure 4:
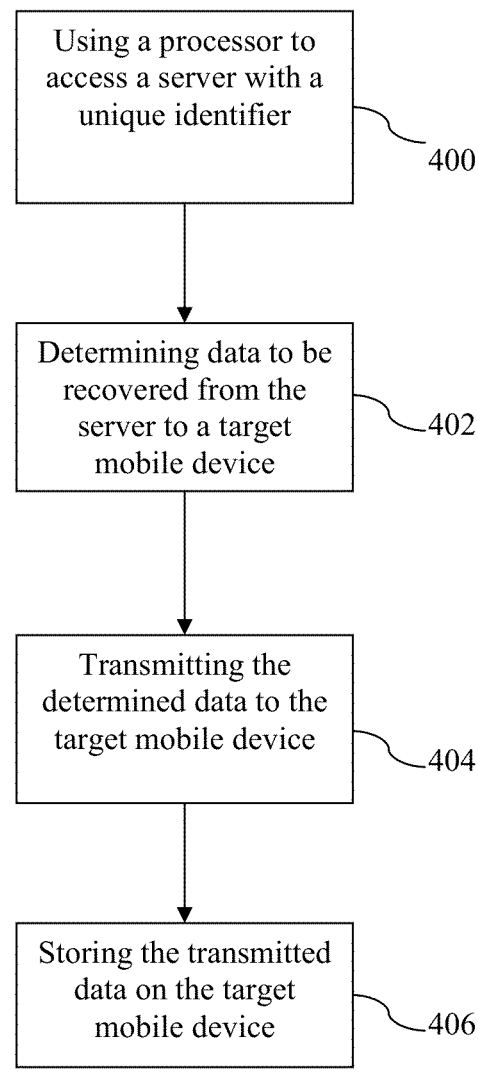
FIG. 4 is a flowchart illustrating a method to recover mobile device data in accordance with some embodiments.

FIG. 4 illustrates a method to restore data to a mobile device in accordance with some embodiments. The method is, step 400 using a processor to access a server with a unique identifier, step 402 determining data to be recovered from the server to a target mobile device, step 404 transmitting the determined data to the target mobile device, and step 406 storing the transmitted data on the target mobile device.

A target mobile device is a mobile device which is receiving data from a server through a recovery process. A source mobile device is a mobile device which provides the data for a recovery process (e.g. is the mobile device which provides the backup data). It should be noted that a target mobile device may receive recovery data from multiple source devices. For example, a user may backup a first source mobile device and a second source mobile device, and restore data from both backups onto a first target mobile device, the first target mobile device being a different device than the two source mobile devices.

When transferring data from a mobile device to a server, or vice versa (e.g. mobile device communicating with server), it is desirable for the communication to be secure. Securing communication may include authenticating the user, using secure protocols, such as the HTTPS protocol, or encryption, among others.

In order to prevent anyone from accessing a user's data, each user may be associated with a unique identifier. As shown in FIG. 2C, in some embodiments the unique identifier may be a username. A username may be in used in combination with a password or other authentication method to verify the user of the mobile device client. To illustrate, a user may enter a username and password asked for by an Atmos server. If the username and password combination is a valid combination, the user will be granted the ability to store data on the Atmos server, as well as the ability to retrieve data from the Atmos server.

It should be noted that a specific username password combination is associated with specific data. For example, suppose there are two username password combinations, and one Atmos server with a storage capacity of 20 GB. The first username password combination is USER1, PassWord1, and is associated with first 10 GB on the Atmos server. The second username password combination is USER2, Password2, and is associated with second 10 GB on the Atmos server. If a user enters USER1, PassWord1, the user will have access to the Atmos server, but will only have access to the first 10 GB. The user will not have access to the second 10 GB. In fact, the user will not be aware of the second 10 GB. Similarly, if a user enters USER2, PassWord2, the user will have access to the second 10 GB, and will not have access to (or be able to see) the first 10 GB.

It should be further noted that different username password combinations may have different specific storage capacities and be allocated different resources. For example, username password combinations that are characterized as "basic membership" may be given only 10 GB of storage space on an Atmos server, as well as limited bandwidth. Another username password combination characterization may be "premium membership," which may give 100 GB of storage space on an Atmos server, as well as maximum bandwidth.

In some embodiments, it may be desirable for multiple mobile devices to share the same unique identifier and verification combination. For example, a family may share one Atmos account. If a son takes a picture on his mobile device and uploads it to the family Atmos account, his mother will be able to see the picture when she logins to the family Atmos account, and be able to download the picture onto her mobile device. In this way, each family member can see what other family members are putting into the family Atmos account. Further, each family member knows that what they put into the family Atmos account will be shared with every other family member.

Synchronization of mobile devices in a mobile device network may also be achieved. For example, a user may designate the user's Atmos server data to be synchronized with the user's mobile device data. This may be preferable when the user does not wish to manually backup data and instead wishes to have the backups be automatic. The Atmos server may compare the data on the Atmos server to the data on the user's mobile device. If there is any discrepancy, such as a new file on the user's mobile device, the Atmos server may update its data to include the new file. Similarly, if the Atmos server detects that a file resides on the Atmos server but not on the user's mobile device, the Atmos server may automatically remove the file from the Atmos server.

The synchronization may be conducted at regular intervals. For example, the Atmos server may check the mobile device client every five hours to conduct the comparison. The more often the comparisons occur, the more synchronized the two are. However, frequent comparisons may consume an undesirable amount of bandwidth, and may put too much of a load on the server and the mobile device.

Further, multiple mobile devices may be synchronized. In some embodiments, this may accomplished by synchronizing a server with Phone A, and synchronizing Phone B with the server. Thus, when a file is added to Phone A, the file will also be added to the server due to its synchronization with Phone A. The file will also be added to Phone B due its synchronization with the server.

Figure 6:
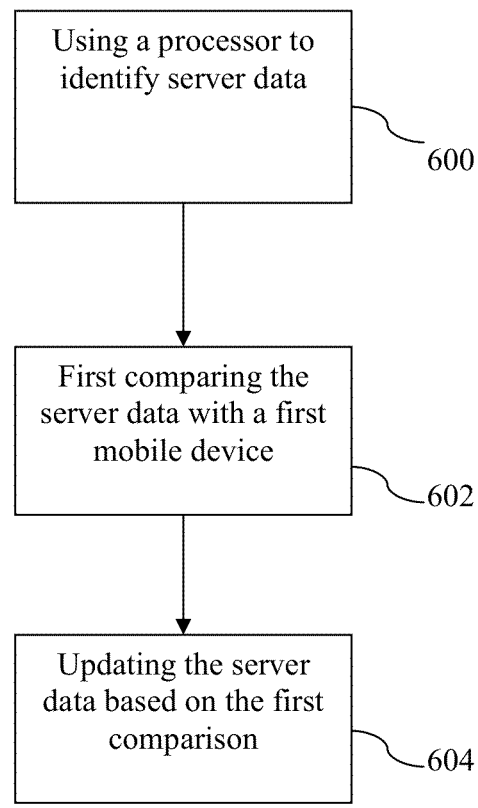
FIG. 6 is a flowchart illustrating a method to synchronize mobile device data in a mobile device network in accordance with some embodiments.

FIG. 6 illustrates a method to synchronize mobile device data in a mobile device network in accordance with some embodiments. The method is, step 600 using a processor to identify server data, step 602 first comparing the server data with a first mobile device data, and step 604 updating the server data based on the first comparison.

In some embodiments, it may desirable to create a group of individual Atmos accounts. For example, each friend in a group of friends may have an individual Atmos account. This group of friends may want to share contact information, photos, videos, and other media with each other. A first friend may create a group "Atmos friend," and a second friend may join the "Atmos friend" group. The first friend may send out an invitation to the second friend, indicating group name, group password, or other authentication information so that the second friend may verify his identity to the group. Once a group has been created, various settings may be configured to customize the level of sharing. For example, the first friend may designate that the second friend can only view the first friend's photos, and not delete them nor add new photos to the first friend's Atmos account. Similarly, the second friend may designate that the first friend can only view a selected portion of the second friend's contacts, and may not delete them nor add new contacts to the second friend's Atmos account. The level of customization can vary greatly.

Similarly, business people may link Atmos accounts to create a group. This may be desirable in cases such as members of a marketing team sharing relevant business contact information with each other.

Figure 5:
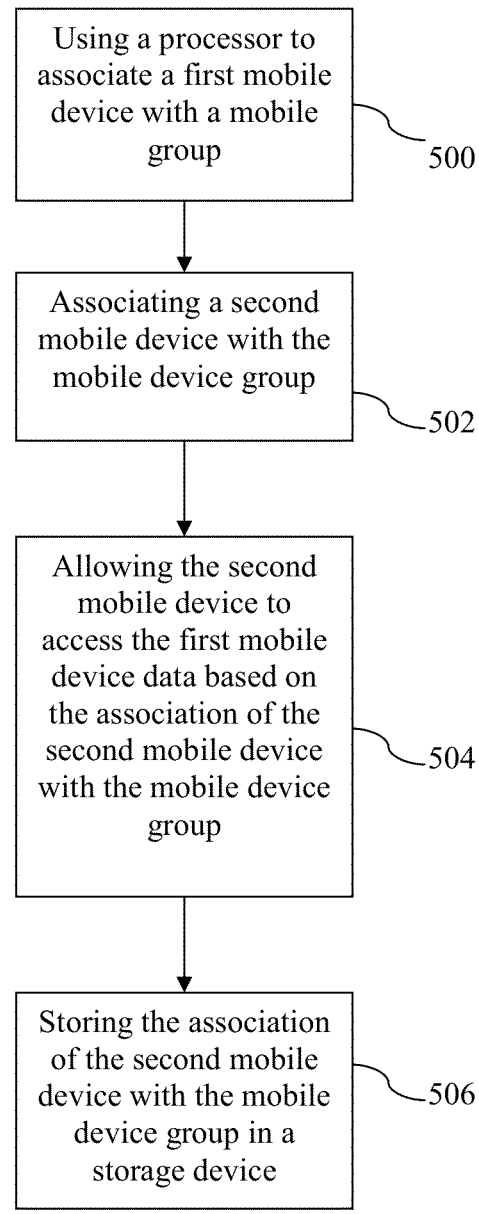
FIG. 5 is a flowchart illustrating a method to share data between a plurality of mobile devices in accordance with some embodiments.

FIG. 5 illustrates a method to share data between a plurality of mobile devices in accordance with some embodiments. The method is, step 500 using a processor to associate a first mobile device with a mobile group, step 502 associating a second mobile device with the mobile device group, step 504 allowing the second mobile device to access the first mobile device data based on the association of the second mobile device with the mobile device group, and step 506 storing the association of the second mobile device with the mobile device group in a storage device.

Due to limited bandwidth resource, in some embodiments it may be desirable to reduce the amount of bandwidth consumed. For example, if an Atmos server contains 100 files, it may take a noticeable amount of time and resources for the mobile device to send and receive requests to display the 100 files. In some embodiments, caching may be used to reduce the amount of bandwidth consumed. Caching includes transparently storing data such that future requests for the data can be identified or served faster.

In some embodiments, thumbnails, object names, or other metadata (data about data) may be stored in a cache. For example, as illustrated in FIG. 2A, the thumbnails, file names, and file sizes of objects stored on a server are displayed. Typically, a mobile device client would send requests to the server to identify and receive the thumbnails, file names, and file sizes. However, in some embodiments, that information is stored in a cache. For example, thumbnails may be stored persistently in a cache on the mobile device. Upon requesting the thumbnails of photos stored on a server, the mobile device looks to its local cache instead of the server, and generates thumbnails based on the cache. This may result in considerable bandwidth savings, especially if many thumbnails are required.

The size of thumbnails and other metadata may vary. For example, in some embodiments, thumbnails may be set to only be 1 kB each. If 1000 unique photos are stored on a server, the thumbnails would consume 1 MB. In this case, using a cache would result in considerable savings in bandwidth consumption. Further, due to the cache being persistent on the mobile device, the mobile device is able to more quickly access the cache than the server, and more quickly display the thumbnails.

The cache may be organized in the same manner as the server. For example, if photo A was uploaded to the server first, then the cache would display photo A first. As new photos are added to the server, the cache is similarly updated. The cache may be updated by the mobile device itself (e.g. locally creating a thumbnail and saving it in the cache upon transmission of the original photo to the server), or may be updated by the server (e.g. the server creates a thumbnail upon receiving an original photo and sends it to the mobile device to store in the mobile device cache.) It is anticipated that the cache may be organized and updated through a variety of methods.

Further, since the cache is locally stored, any data stored in it (e.g. thumbnails, list of file names, file size, etc.) may be accessed without connection to the server. In some cases, a mobile device may lose connection to the server. This may happen for any number of reasons, such as driving through a tunnel, going out of a specified coverage area, or service provider hardware failure, among others. Typically, if a mobile device loses connection to a server, the mobile device cannot access a list of files stored on the server. However, since the cache contains this information, the mobile device can view the cache and determine the list of files stored on the server. Depending on how often the cache is updated, there may be events which may lead to some discrepancies between the cache list and the server list, such as the server receiving a new file, but not updating the cache immediately.

Policies may be used to determine how the cache is used. In some embodiments, a policy may dictate that only the filename and date of creation are stored in the cache. The policy may also dictate that the cache size initially be 1 MB, and that upon reaching 90% of the initial capacity, a user be prompted to either increase the size of the cache, or to remove certain items from the cache. Policies may be customized in a wide variety of ways, the aspects of the cache they govern may vary greatly.

Figure 7:
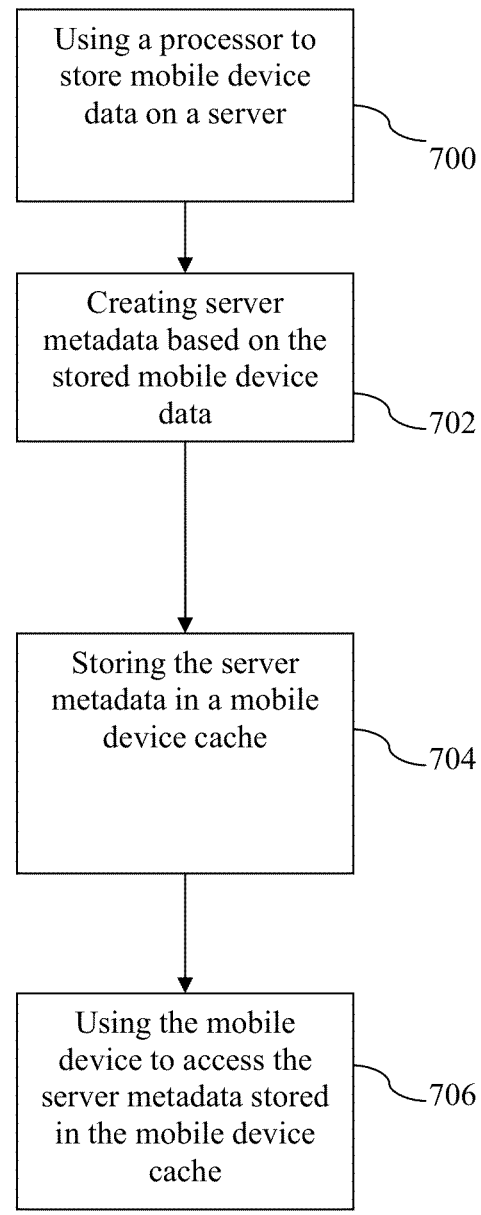
FIG. 7 is a flowchart illustrating a method to optimize resource use in a mobile network utilizing a cache in accordance with some embodiments.

FIG. 7 illustrates a method to optimize resource use in a mobile network utilizing a cache in accordance with some embodiments. The method is step 700, using a processor to store mobile device data on a server, step 702 creating server metadata based on the stored mobile device data, step 704 storing the server metadata in a mobile device cache, and step 706 using the mobile device to access the server metadata in the mobile device cache.

In some embodiments, it may be preferable to create an image, or a snapshot of a mobile device. A snapshot includes all of the data on the disk of the mobile device (e.g. photos, files, etc.), as well as the data in the memory (volatile) of the mobile device and the state of applications running By creating a snapshot, a user may capture the entire state of the mobile device. This allows for a full device recovery. For example, a user has a browser open on an original mobile device, and has 1 GB worth of data saved on the mobile device. A snapshot may be created, which not only saves the 1 GB worth of data, but also the memory, the operating system, and the state of each application (e.g. the open browser). Once the snapshot is created, the snapshot is stored on a server. If the user's original mobile device is broken or damaged, the user may recover the snapshot to a new mobile device. Upon recovery, the new mobile device will be in the same state as the original mobile device at the time the snapshot was created. In other words, the new mobile device will have the same 1 GB worth of data, the same operating system, the same memory, and the same state of each application (e.g. the open browser).

Though a snapshot may be created for all of the data on a mobile device, the snapshot may also contain only a portion of the data. For example, a snapshot may be created for an individual folder stored on the mobile device, only certain types of files, etc. It should be noted that the snapshot created will not be usable by most applications. For example, a snapshot may be contain only photo files. However, conventional photo viewing applications would not be able to understand the snapshot, nor read the individual photos in the snapshot. Though the snapshot may be a "file of files," the application used to access the files will not be able to access the "file of files."

A snapshot may be created by a server, or may be created locally by a mobile device. Resources may determine which is more desirable to create the snapshot. For example, if a server has a lot of processing power and memory, and bandwidth is plentiful, it may be more desirable for the server to create the snapshot.

Figure 8:
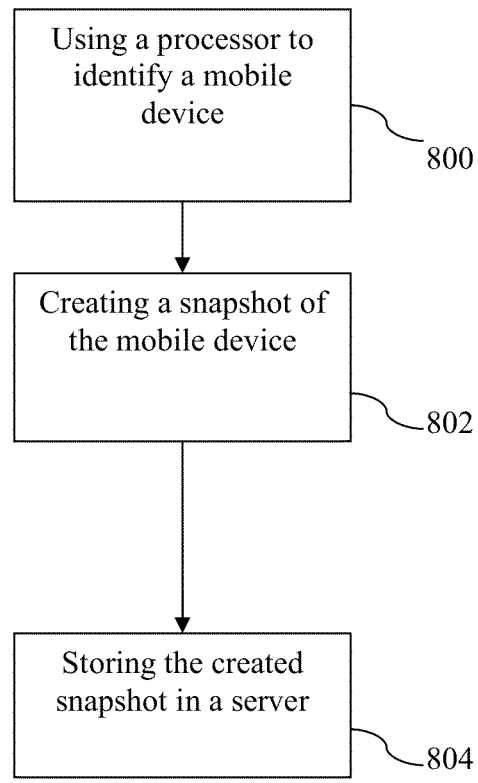
FIG. 8 is a flowchart illustrating a method to backup mobile device data in accordance with some embodiments.

FIG. 8 illustrates a method to backup mobile device data in accordance with some embodiments. The method is, step 800 using a processor to identify a mobile device, step 802 creating a snapshot of the mobile device, and step 804 storing the created snapshot in a server.

In order to reduce the load on the mobile device, in some embodiments, an Atmos server may poll a service provider for updates to a snapshot or to backup additional data. For example, as a user sends email messages or text messages, those messages go through a service provider's (e.g. AT&T, Verizon, etc.) server. In some embodiments, an Atmos server may poll the service provider's server every hour (or any other regular or irregular interval) to look for any new transmissions. If the Atmos server discovers a new email message on the service provider's server, the Atmos server may backup the new email message onto the Atmos server. By having the Atmos server poll the service provider's server, the process is transparent to the mobile device (e.g. the mobile device did not have to specify the new email message be backedup), and upon restore, the mobile device will be able to recover the new email message.

Figure 9:
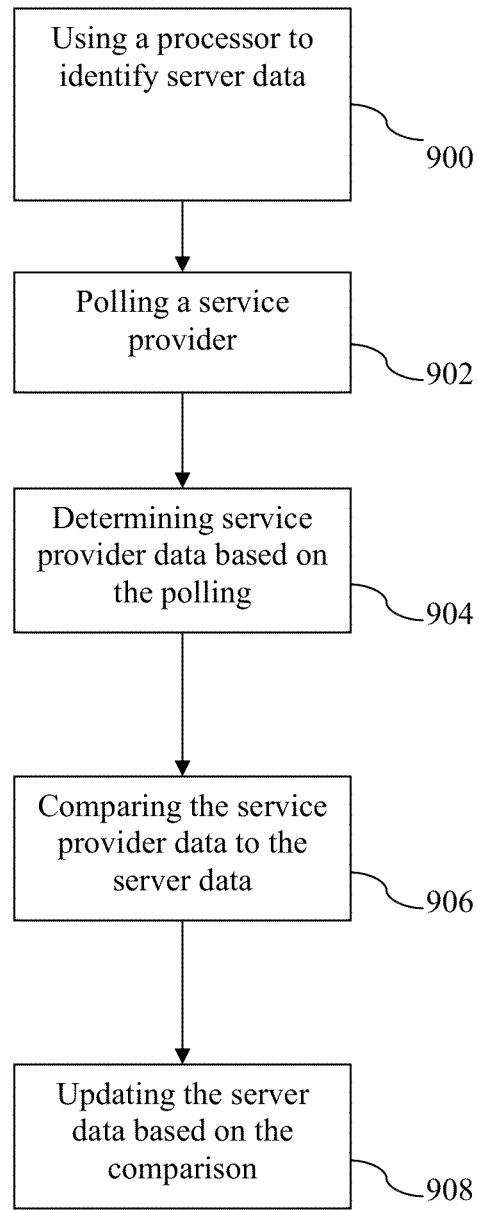
FIG. 9 is a flowchart illustrating a method to backup mobile device data in accordance with some embodiments.

FIG. 9 illustrates a method to backup mobile device data utilizing polling in accordance with some embodiments. The method is, step 900 using a processor to identify server data, step 902 polling a service provider, step 904 determining service provider data based on the polling, step 906 comparing the service provider data to the server data, and step 908 updating the server data based on the comparison.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for managing mobile device data, comprising:
using a processor to access a server with a unique identifier;

allocating bandwidth and storage resources based on the unique identifier;
storing data of a source mobile device designed to only operate in a first geographical area to the server based on the unique identifier, wherein the stored data comprises a snapshot of the source mobile device, the snapshot including data on disk and data in memory;
determining data to be transferred to a temporary mobile device designed to only operate in a second geographical area, wherein the second geographical area is different from the first geographical area, wherein the determined data is the data from the source mobile device;
transmitting the determined data to the temporary mobile device to allow a user of the source mobile device to use the temporary mobile device as a substitute for the source mobile device while the user is traveling in the second geographical area;
determining data to be recovered to a target mobile device, wherein the determined data is the data from the source mobile device, and wherein determining data to be recovered includes determining a file from a plurality of files to be recovered;
transmitting the determined data to the target mobile device based on the unique identifier; and
storing the transmitted data on the target mobile device.

2. The method as recited in claim 1, wherein the source mobile device and the target mobile device is the same mobile device.

3. The method as recited in claim 1, wherein the source mobile device and the target mobile device is not the same mobile device.

4. The method as recited in claim 1, wherein access a server with a unique identifier includes provide a verification.

5. The method as recited in claim 1, wherein transmitting the determined data to the target mobile device includes transmitting the determined data to a plurality of target mobile devices.

6. The method of claim 1 wherein the determining data to be transferred to a temporary mobile device comprises receiving from the user of the source mobile device a selection of a subset of contacts on the source mobile device to be transferred to the temporary mobile device.

7. The method of claim 1 comprising:
receiving, at the server, a user selection of contacts on the source mobile device to be transmitted to the temporary mobile device; and
transmitting from the server to the temporary mobile device the user selection of contacts, wherein contacts on the source mobile device outside the user selection of contacts are not transmitted to the server to the temporary mobile device.

8. The method of claim 1 wherein the transmitting the determined data to the temporary mobile device comprises:
transmitting the determined data from the server to the temporary mobile device.

9. The method of claim 1 wherein data of the source mobile device is stored at the server before the data is transmitted to the temporary mobile device.

10. A system for managing mobile device data, the system comprising a server, a source mobile device, a target mobile device, and a processor configured to:
use a processor to access a server with a unique identifier;
allocate bandwidth and storage resources based on the unique identifier;
store data of a source mobile device designed to operate only in a first geographical area to the server based on the unique identifier, wherein the stored data comprises a snapshot of the source mobile device, the snapshot including data on disk and data in memory;
determine data to be transferred to a temporary mobile device designed to operate only in a second geographical area, wherein the second geographical area is different from the first geographical area, wherein the determined data is the data from the source mobile device;
transmit the determined data to the temporary mobile device to allow a user of the source mobile device to use the temporary mobile device to communicate when the user is in the second geographical area;
determine data to be recovered to a target mobile device, wherein the determined data is the data from the source mobile device, and wherein determining data to be recovered includes determining a file from a plurality of files to be recovered;
transmit the determined data to the target mobile device based on the unique identifier; and
store the transmitted data on the target mobile device.

11. The system as recited in claim 10, wherein the source mobile device and the target mobile device is the same mobile device.

12. The system as recited in claim 10, wherein the source mobile device and the target mobile device is not the same mobile device.

13. The system as recited in claim 10, wherein access a server with a unique identifier includes provide a verification.

14. The system as recited in claim 10, wherein transmit the determined data to the target mobile device includes transmit the determined data to a plurality of target mobile devices.

15. A computer program product for managing mobile device data, comprising a non-transitory computer usable medium having machine readable code embodied therein for:
using a processor to access a server with a unique identifier;
allocating bandwidth and storage resources based on the unique identifier;
storing data of a source mobile device designed to operate in a first geographical area to the server based on the unique identifier, wherein the stored data comprises a snapshot of the source mobile device, the snapshot including data on disk and data in memory;
determining data to be transferred to a temporary mobile device designed to operate in a second geographical area, wherein the second geographical area is different from the first geographical area, the source mobile device is configured to operate with a mobile device network when the source mobile device is in the first geographical area and is not configured to operate with the mobile device network when the source mobile device is in the second geographical area, and wherein the determined data is the data from the source mobile device;
transmitting the determined data to the temporary mobile device, wherein the determined data transmitted to the temporary mobile device comprises a subset of contacts on the source mobile device selected by a user of the source mobile device, thereby allowing the user to use the temporary mobile device to communicate when the user is in the second geographical area;
determining data to be recovered to a target mobile device, wherein the determined data is the data from the source mobile device, and wherein determining data to be recovered includes determining a file from a plurality of files to be recovered;
transmitting the determined data to the target mobile device based on the unique identifier; and
storing the transmitted data on the target mobile device.

16. The computer program product as recited in claim 15, wherein the source mobile device and the target mobile device is the same mobile device.

17. The computer program product as recited in claim 15, wherein the source mobile device and the target mobile device is not the same mobile device.

18. The computer program product as recited in claim 15, wherein transmit the determined data to the target mobile device includes transmit the determined data to a plurality of target mobile devices.

19. The computer program product as recited in claim 15, wherein accessing a server with a unique identifier includes providing a verification.

20. The computer program product as recited in claim 15 comprising not transmitting unselected contacts on the source mobile device to the temporary mobile device.

* * * * *